March 24, 1970  S. NATELSON  3,502,438
AUTOMATED TAPE CHEMICAL ANALYZER
Filed Nov. 13, 1967  4 Sheets-Sheet 1

BY SAMUEL NATELSON
*INVENTOR.*
George B. Oujevolk
ATTORNEY

March 24, 1970     S. NATELSON     3,502,438
AUTOMATED TAPE CHEMICAL ANALYZER
Filed Nov. 13, 1967     4 Sheets-Sheet 2

SAMUEL NATELSON
*INVENTOR.*

BY *George B. Oujwolk*

ATTORNEY

March 24, 1970  S. NATELSON  3,502,438
AUTOMATED TAPE CHEMICAL ANALYZER

Filed Nov. 13, 1967  4 Sheets-Sheet 3

SAMUEL NATELSON
*INVENTOR.*

BY George B. Oujevolk
ATTORNEY

March 24, 1970      S. NATELSON      3,502,438

AUTOMATED TAPE CHEMICAL ANALYZER

Filed Nov. 13, 1967      4 Sheets-Sheet 4

BY    SAMUEL NATELSON

*INVENTOR.*

George B. Oujevolk

ATTORNEY

United States Patent Office 3,502,438
Patented Mar. 24, 1970

3,502,438
AUTOMATED TAPE CHEMICAL ANALYZER
Samuel Natelson, Chicago, Ill., assignor to Scientific Industries, Inc., Hempstead, N.Y.
Filed Nov. 13, 1967, Ser. No. 682,063
Int. Cl. G01n 33/16
U.S. Cl. 23—253                 15 Claims

ABSTRACT OF THE DISCLOSURE

A device for automatic chemical analysis having two drums, which are spring loaded. The drums move in opposite direction and move a multiple tape combination. The two drums are rotated by a positive drive mechanism so that they move at a definite predetermined rate of speed. The tapes are contained on payoff reels which are to be moved at the constant rate of speed. Guide rollers and collecting means bring the tapes together in alignment before passing these tapes through a point of contact of the drums. Past the point of contact, distributing means separate the tapes after a definite time of contact and take-up means collect the tapes. A sample is dispensed on one of the tapes at a sample dispensing station. This sample is transferred to another tape by passing the tapes through the two drum arrangement. This transfer provides a sample spot which can be read by electric reading means located at a reading station just before the take-up reel of the tape to which the sample has been transferred.

BACKGROUND OF THE INVENTION

Field of the invention

The present invention relates to an apparatus for chemical analysis and more particularly to an improved automated tape chemical analyzer.

Description of the prior art

This invention is an improvement over the following U.S. patents of the present inventor Dr. Samuel Natelson: Nos. 3,036,893; 3,216,804; 3,219,416; 3,260,413; 3,261,668; and 3,331,665.

In the aforementioned systems of the prior art described by the inventor herein, various problems arose. The instruments therein described are somewhat bulky and cumbersome and cannot be readily shifted about from one location to another. Although when originally installed, the various tapes could move without slippage, when the apparatus was moved about it was necessary to reset various rollers and payoff reels. Test runs had to be made to insure uniform movement of the tapes.

SUMMARY OF THE INVENTION

Broadly stated, the present invention contemplates a device for automatic chemical analysis which comprises two drums, at least one of which is spring loaded. These drums move in opposite directions. The drums move a multiple tape combination. The spring loading insures that a definite positive pressure is exerted by one drum on the other. The two drums are rotated by a positive drive mechanism so that they move at a definite predetermined rate of speed. The use of a combination of spring tension between the drums, a positive synchronized drive for both drums and the wrapping of the tapes around both rollers provides a smooth motion without slippage between the tapes. The tapes are contained on payoff reels which are to be moved at the constant rate of speed. Guide rollers and collecting means bring the tapes together in alignment before passing these tapes through a point of contact of the drums. Past the point of contact, distributing means separate the tapes after a definite time of contact and take-up means collect the tapes. Sample dispensing means and electronic sample reading means are also provided.

The invention as well as other objects and advantages thereof will be more apparent from the following detailed description when taken together with the accompanying drawing.

BRIEF DESCRIPTION OF THE DRAWINGS

FIG. 2a is an enlarged view of one of the components shown in FIG. 2.

DETAILED DESCRIPTION

As has been demonstrated in the past, in the case of a paper-tape type of chemical analyzer, the object is to present uniform spots to an electronic reading means. As taught in the Samuel Natelson U.S. Patent No. 3,036,893, the sample is preferably first deposited on confined spots on a sample receiving tape. The sample receiving tape with the sample on the confined spot is then brought into face to face relationship with a reagent-containing tape. Interposed between these two tapes is a porous tape. When these three tapes are pressed together, the sample is then transferred as a uniform spot onto the reagent-containing tape. The reagent-containing tape can then be heated, dried and fed to a reading station which will read out the sample brought out by the reagent.

Preferably, the confined spot arrangement consists of a porous circle on a plastic tape although a plastic ring on a porous tape may also be used for some purposes.

Figure 1A:
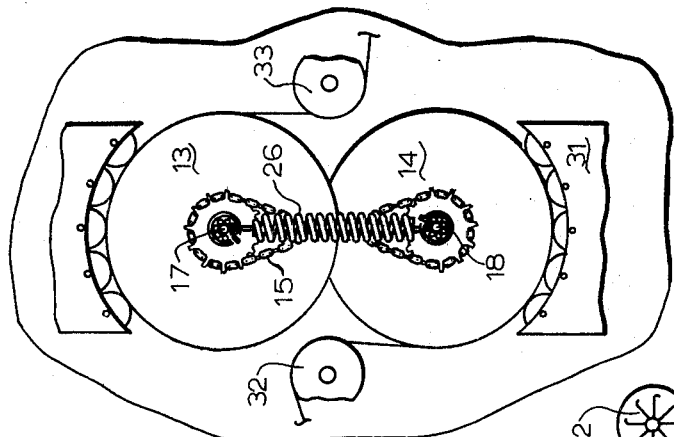
FIG. 1a is an enlarged view of one of the assemblies shown in FIG. 1.
Figure 1:
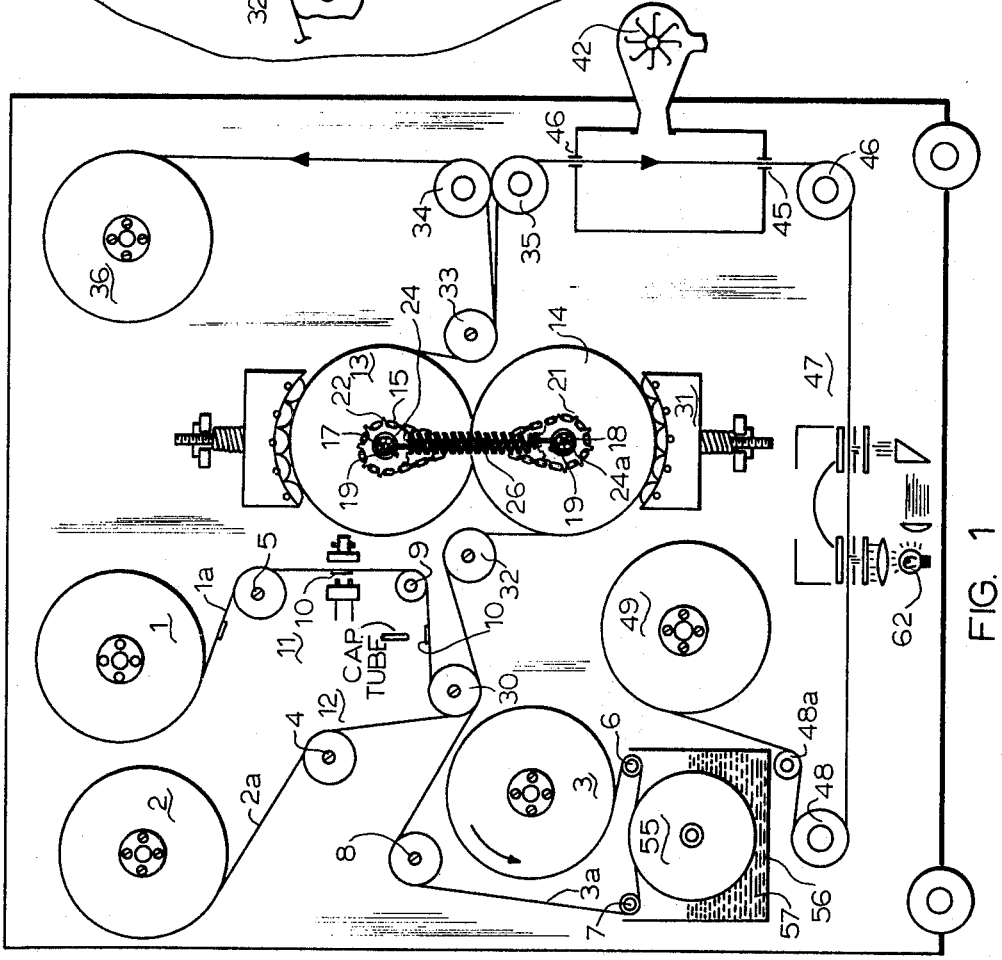
FIG. 1 shows a plan view of the front side of the apparatus contemplated herein.
Figure 2:
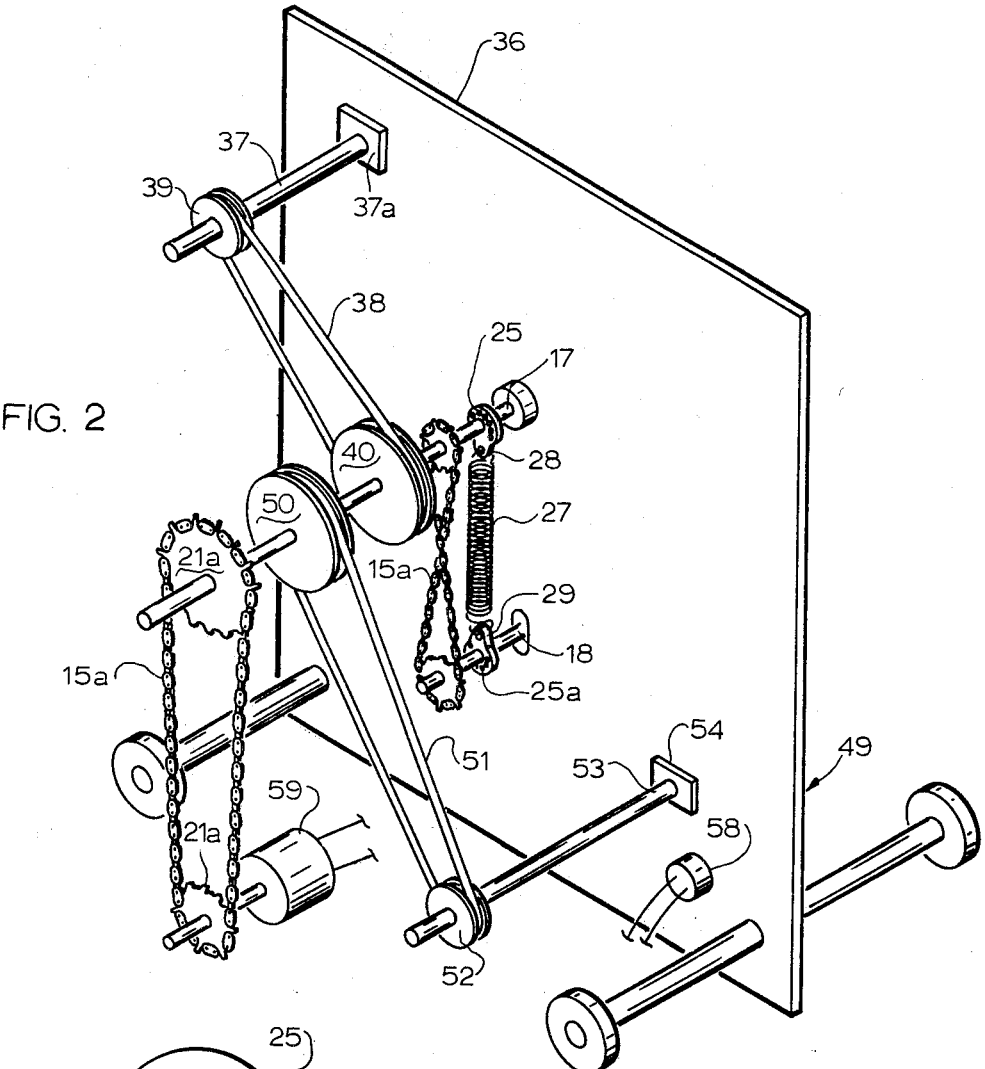
FIG. 2 is a rear view of the apparatus shown in FIG. 1.

Shown in the drawing are three pay-off reels, 1, 2 and 3 respectively containing the sample receiving tape, the porous tape and the reagent-containing tape. These three tapes will be guided to a sample transfer station by means of guide rollers, 4, 5, 6, 7, 8, and 9. To this end, the apparatus is disposed on a rectangular and fairly square breadboard type of structure. This structure is designed to stand vertically and hold the various rollers which are mounted for rotation in the vertical plane. In one corner of the apparatus e.g., the lefthand corner, is pay-off reel 2 of the porous tape 2a whereas to the right is pay-off reel 1 for the sample receiving tape 1a and below it is the pay-off reel 3 of the reagent-containing tape 3a. Wound on pay-off reel 1 is a tape 1a with absorbent discs 10 uniformly disposed over the length of the tape. Wound on pay-off reel 2 is a porous tape 2a and wound on reel 3 is a dry tape 3a which will serve as the reagent-containing tape, to which reagent will be added. From pay-off reel 1, the sample receiving tape 1a (which as yet contains no sample) passes vertically downwards along guide rollers 5 and 9 before a sensing unit which will sense the location of the tape. This sensing unit is timing control station 11 disposed under pay-off reel 1. The function of this station will be explained in greater detail presently. Essentially, the timing control station 11 consists of two switches in series which are enabled by the thickness of discs 10. A photoelectric switching arrangement may also be used. The supporting tape is transparent and when the disc comes into the field it can interrupt a light beam. Guide roller 5 directs the tape down towards the switches while guide roller 9 directs the tape horizontally to a sample dispensing station 12 towards the upper left of the apparatus. At this sample dispensing station 12, a drop of sample will be placed on the confined spot 10. After having received the sample, the sample receiving tape will go to a junction point where the three tapes are joined. In the meantime, the reagent-containing tape 3a (which as yet has no reagent therein) on pay-off reel 3 is directed by two guide rollers 6 and 7 over a ceramic motor driven roller which is housed in a container and contains a reagent. The roller takes up reagent and wets the underside of the reagent-containing tape with reagent. This action of applying reagent will also be explained in greater detail herein. The tape is then guided past its pay-off reel by the action of guide rollers 7 and 8 to the junction point of the three tapes. The porous intermediate tape 2a on pay-off reel 2 is likewise guided by a roller 4 to the junction point of the three tapes. From the junction point, these three tapes will eventually pass between two centrally located drums 13 and 14 driven by chains 15 and 14a. One chain being in front and the other in back. Corresponding to the chain drive are axles 17 and 18 with bearings 19 and 20 holding sprockets 21 and 22 for the chain drive. Since the drums 13 and 14 rotate in opposite directions the chains on both sides cross over. The drums 13 and 14 are pulled together by springs 26, 27. Thus (as shown in FIG. 2) spring 27 terminates in hooks 28 and 29. These are held on the axle by four ball bearings 24, 24a on front and 25 and 25a in back. Thus the axles turn in these bearings while being pulled together by the spring.

The three tapes which have been brought together at a junction point must be guided to the spring drum arrangement. To this end, the three tapes join at a recessed collection roller 30 which passes them on to a recessed guide roller 32 located at the tangential junction of the two drums 13 and 14. The three tapes go down around drum 14 over a heating shoe 31 which is a spring loaded heating block and press plate held by a tension spring and adjustment nut. The heating shoe has a plurality of rollers heated by a heating coil not shown. These rollers thus heat the three tapes which then pass between the intersection of the drums in figure eight fashion and over drum 13 which may also have a second heating shoe. At the end of the figure eight path of travel, i.e., on the other side (righthand side) of the intersection of the two drums is a recessed guide roller 33. This roller will lead the three tapes to a tape separation zone on the righthand side of the breadboard consisting of two distributing rollers 34, 35. Here the tapes separate. The sample-receiving tape and porous tape go in one direction to an upper take-up reel 36. The reagent-containing tape which now has the sample thereon goes down in the opposite direction into a vertical drying chamber 43 defining a drying zone and located on the lower righthand side of the breadboard. Warm air flows through the heating zone by means of a fan 42. The reagent-containing tape enters and leaves this drying zone through two very narrow slits 44 and 45. At the exit of the drying zone is another guide roller 46. The reagent-containing tape with the sample now developed into a stain, now turns 90° to the horizontal and travels along the bottom of the breadboard towards the left into a reading zone 47. After passing through the reading zone, the reagent-containing tape is finaly taken up by a reagent tape take-up reel 49, after passing over one or more guide rollers 48, 48a.

Reviewing for a moment the sequency of operations just described, the three tapes are rolled on pay-off reels on the upper left of the breadboard. A sample is applied to one of the tapes and reagent to another; then, by means of a series of guide rollers the three tapes arrive at a junction point on the lefthand side of two drums and then pass in a figure eight across the two drums to the righthand side of the instrument. Here the tapes separate. Two of the tapes go vertically to the upper right to be taken up on a take-up reel while the third tape to which the sample has been transferred goes vertically through a drying zone to the lower right then by means of a guide roller past a reading zone along the lower edge of the instrument and on to a take-up reel on the lefthand side of the instrument.

To fully understand the operation of the instrument, it is necessary to go to FIG. 2, showing the back of the breadboard. Two separate motors are provided, a main drive motor and a motor to drive the reagent roller. The reagent is dispensed by a ceramic roller 55 located on the front side of the breadboard. This roller is contained in a reagent chamber 56 maintained at a constant level with a reagent 57. The ceramic roller 65 is driven by a separate motor 58. The roller 65 constantly applies reagent to its tape. The main motor of the instrument 59 drives a main drive shaft 16. Main drive shaft 16 is an extension of or integral with axle 17. On the reverse side are a set of sprockets 21a driven by chains 15a. Mounted on main drive shaft 16 are belt pulley drive wheels 40 and 50. Wheel 40 drives take-up reel 36 by driving its axle 37 journaled in bearing 37a by beans of a slipping spring belt 38 for maintaining the tension of take-up reel 36. The drive is by means of a corresponding drive wheel 39, on axle 37. The take-up reel 49 drive arrangement for the reagent-containing tape is constructed in a similar fashion. Its shaft 53 is journaled in a box of ball bearings 54 and driven from pulley 50 on the main drive shaft, by means of belt 51 engaging pulley 52 on take-up reel shaft 53.

Figure 3:
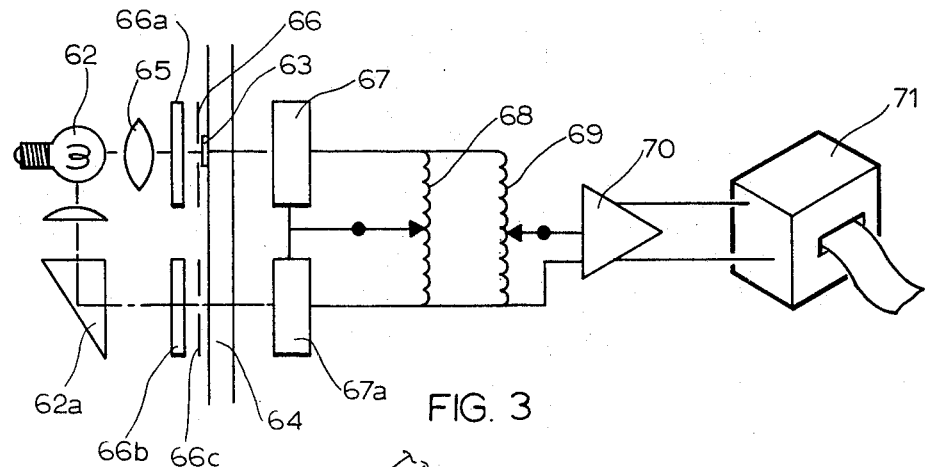
FIG. 3 is a simple schematic diagram of the operation of one of the components shown in FIG. 1.
Figure 4:
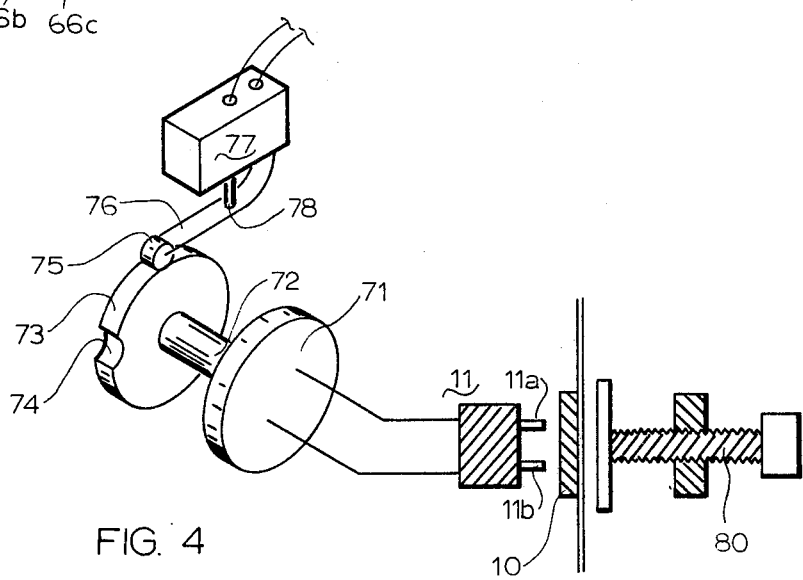
FIG. 4 is a partly schematic and partly perspective explanation of the timing sequence which operates the instrument shown in FIG. 1.
Figure 5:
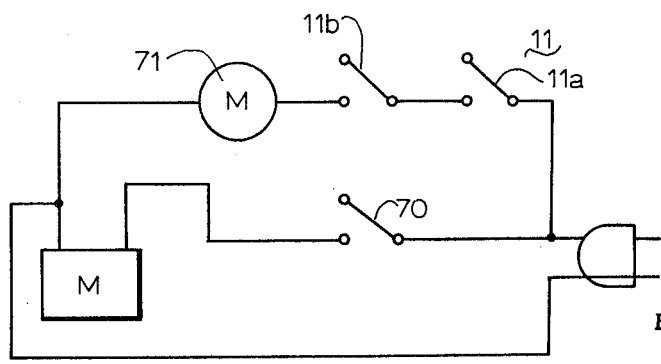
FIG. 5 is a further schematic explanation of the timing seuence shown in FIG. 4.

The reading station is generally designated by number 47 and has a light source 62, supplying light across a sample containing a spot 63 and a blank spot 64. This is done by means of two separate light channels (see FIG. 3). In the first channel, light travels across a collimating lens, 65, a filter 66a to provide monochromatic light, and a diphragm 66 to limit the light area across a spot with the sample 63 into a first photocell 67. Along the second path, the light passes through a collimating lens 65a a reflecting prism 62a, a filter 66b and a diaphragm 66c into a photocell 67a. The output of one photocell receiving the blank spot signal balances out the background of the tape. This is done by a potentiometer arrangement 68. A second potentiometer 69 provides ranges on the readout device. The output from the second potentiometer 69 is amplified in an amplifier 70 and printed out in a readout device 71.

OPERATION OF INSTRUMENT

The instrument operates as follows: The pay-off reels deliver sample-tape (porous discs on Mylar), the intermediate porous tape, the reagent-containing tape backed with Mylar (which at this stage contains no reagent). The reagent-containing tape is wetted with roller as shown in the drawing or by spray. The reagent-containing tape may be dry, i.e., containing a dried reagent thereon.

Sample may be deposited on sample receiving tape by a tilting arrangement. The sample may be human blood or blood serum of the order of 5–100 $\mu$l. If the reagent-containing tape is a dry tape then the blood sample is first diluted five fold with water or normal saline from an autodilutor. As an alternative, if the reagent containing tape is dry, a blood sample may be deposited simultaneously with 5 times its volume of diluent from a syringe. The instrument movement stops for 5 seconds while reagent is deposited. The tapes all come together and go around the driving drums where pressure is applied (9–30 lbs.) between the drums. Also, the pay-off reels and the take-up reels apply constant tension to the tapes.

After a fixed time, the sample and intermediate tape separate from the reagent tape. The sample and intermediate tapes are taken up on tension roller. The reagent tape goes through the heated area where it is dried. The developed colored spots now move through the reading zone. When peak absorbance is reached a switch is activated which operates the printer. This operates on the principle that when a positive slope on an absorbance curve changes to a negative slope the printer is activated.

Several tests may be done simultaneously, if more than one reagent roller is supplied. In this case the reagent tape is split lengthwise as is the sample tape. Two samples are deposited and two readout positions are supplied with one porous tape. Where two colors are developed by the same reagent for two different components, which can be separated by filters on the densitometer, then one sample is used. The reagent tape is read at one position with one filter and at another position with a second filter.

The intermediate tape may be eliminated under special conditions. If the sample is essentially colorless such as human blood serum and if proteins do not interfere then the intermediate tape may be dispensed with. The sample is stamped on the reagent tape by the sample discs and color can then be developed.

A Fluorescence meter may read the spots. In this mode a collimated beam of ultraviolet light 81, i.e., across a U.V. filter, spot 63 at an angle of 45°. Fluorescence may then be measured by the detector photocell 67 placed perpendicular to the spot or at 90°. If reflectance measurement is desired then the detector is placed at 135° to read the reflected light. The operator is instructed as follows:

(1) Fill the reagent container with suitable reagent for the particular component desired (see examples below). Set temperature to desired temperature at drums.

(2) Press power switch to activate the instrument.

(3) Wait until wet reagent paper reaches the sampling zone. If a dry reagent tape is used this waiting period is unnecessary.

(4) Apply sample (10–100 $\mu$l.) manually to disc, from a capillary dispenser automatically or from an automatic autodilutor.

(5) Results will be recorded on printer at desired rate of from 1–10 minutes. This is controlled by speed control on control box.

(6) To change to a different test empty and rinse reagent container and replace with a new reagent. Wait until this reagent reaches the sampling area before applying the sample.

(7) For dry tape operation, replace the reagent tape for the new test.

Example of reagents used for various procedures (1) *Glucose.*—Use cellophane as intermediate tape. Reagent contains glucose oxidase, horseradish peroxidase, 1% ortho-dianesidine, 0.5% gelatin all made up in pH 7.3 buffer, 0.5 M.

(2) *Urea.*—1 gm. dimethylaminobeyaldehyde and 2 gm. of either oxalic acid, citric acid or toluenesulfonic acid are dissolved in 100 ml. of 0.5 N HCl. Use cellophane tape as intermediate tape.

(3) *Protein.*—Use micropore cellulose acetate as intermediate tape. For albumin assay dissolve 200 mg. of 2-(4-hydroxyazo benzane) benzoic acid in 500 ml. water to which has been added 10 ml. of 37% neutral formalin. Now add 500 ml. of 0.1 M acetate buffer pH 5.0. Add 100 ml. of 2% of the sodium salt of ethylene diamine tetra acetic acid. Adjust pH to 5.0 and make up to a final volume of 2 liters. For total protein: Dissolve 100 mg. of congo red in 100 ml. of water. Add 100 ml. of 1 N tartrate buffer pH 2.5 and make up to one liter with water.

(4) *pH.*—Example using dry tape, 100 mg. of purified and dialyzed egg albumin is dissolved in 150 ml. of water. To this solution is added 25 mg. phenol red and 30 ml. of 0.01 N NaOH. and the solution is made to one liter. The paper is wetted with this reagent and dried by lyophylization. Micropore cellulose acetate tape is used as intermediate tape.

(5) *Ammonia.*—Example using dry tape. Mix equal volumes of 12% chloramine T. 5% phenol, 20% trisodium phosphate in 0.01 N NaOH and 0.2% sodium nitroprussid. Impregnate paper and dry by lyophilization, cellophane porous tape is used.

All above reagents can be supplied as solutions or can be used to prepare dried tapes. If the sample is colorless, for protein, pH and glucose the intermediate tape may be dispensed with.

The device is started by pressing the main switch 70 which starts to pull the tapes. Finally, one of the confined spots 10 passes before the two switches 11 which are in series. When the two switches 11a and 11b are both closed, the timer motor 71 starts to turn. This motor in turn has a drive shaft 72 which turns a cam wheel 73 having a dead slot 74. Cam wheel 73 engages a roller 75 connected to a resilient piece 76. Resilient piece 76 is disposed over a switch 77 with a switch button 78 acted on by resilient piece 76. Now when roller 75 is in dead slot 74, button 78 is out and the main motor turns however when button 78 is pressed in, the main motor stops. By closing the two switches the timer motor 71 starts to turn cam wheel 72. The dead spot 74 turns, roller 75 lifts up and presses on the button 78 opening switch 77 which stops the main motor. Meanwhile the cam 72 rotates for eight seconds at which time the main motor starts again pulling the paper which opens up one of the two series switches 11. Although in theory it is possible to use only one switch 11, in practice, two switches work better. When the confined spot wafer presses over the first switch 11a, nothing happens. It is only when it presses over switch 11b also that the timer motor starts. This centers the spot in position. As roller 75 again enters dead spot 74, the main motor starts and the confined spot wafer moves off switch 11a. This opens up the timer circuit and the main motor starts up. Repeating the sequence until the next confined spot again passes before the two switches 11. This eight second time lag is sufficient to permit the sample to be applied and the developed spot at the reading station to be read and the resulting recorded. It is important to note that the interruption of the main motor does not interrupt the procedure of placing reagent on the reagent-containing tape. Since various tapes, commercially available, of confined spots may not have the same thickness it is preferable to be able to adjust the position of the tape passing over the switch button 78 by means of an adjustable back 80.

Figure 6:
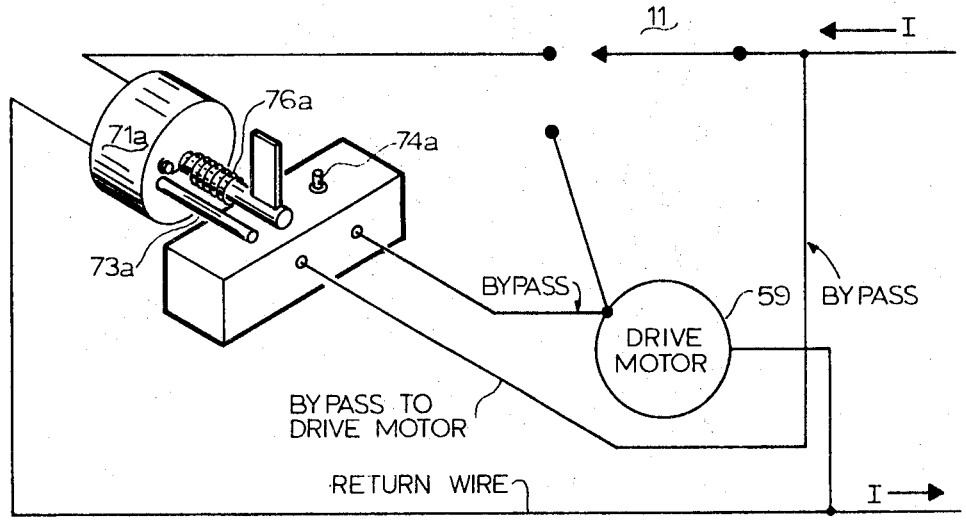
FIG. 6 shows a schematic explanation of an alternative electrical switching arrangement used in the instrument shown in FIG. 1.
Figure 7:
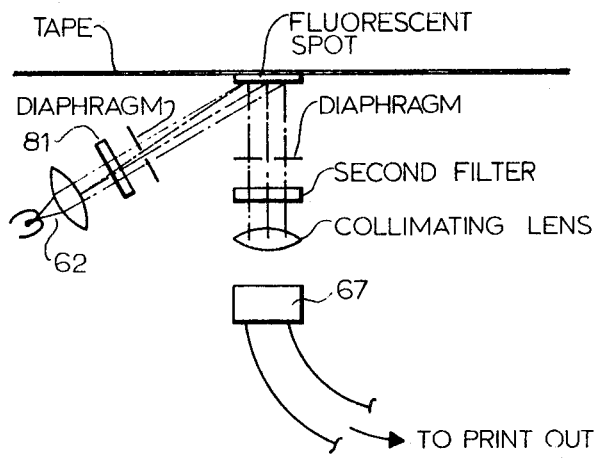
FIG. 7 shows in schematic form a readout arrangement useful with the present invention.

An alternative switching arrangement is shown in FIG. 6. This makes use of an adjustable, spring loaded timer motor commercially available from Industrial Timer Corp. When the paper switch 11 is activated, either by interruption of a light beam or applying pressure to a switch because of the thickness of the paper, the drive motor 59 is stopped and the timer motor 71a starts. At the end of the desired time, the timer motor stop 73a reaches a switch button 74a and presses it. This creates a by-pass for the drive motor 59. The drive motor pulls the paper disc out of the field causing the paper switch 11 to open the position. This stops current to the timer motor which flips back to its original position because of a spring 76a. This eliminates the by-pass to the drive motor. The drive motor continues since it now receives its current across paper switch 11. When the next confined spot paper disc moves into the field, the cycle is repeated.

It is to be observed therefore that the present invention provides for an automated chemical analysis device which is mounted on a support structure to support the various components. The chemical analysis will be done by means of a tape arrangement, which in the case of a three tape arrangement will consist of a sample receiving tape 1a having thereon discs of absorbent material at equally spaced intervals so as to receive the sample to be analyzed, a reagent-containing tape 3a which may have the reagent in dry form already placed thereon or may be a mere blank tape with the reagent to be subsequently added in the device. Also, there can be an intermediate porous tape 2a through which the sample will pass. Mounted in the support structure are first and second drums 13 and 14 disposed for rotation along a contact surface in contact with one another. At least one, preferably both of these drums should be spring loaded so that the drums are pressed one against the other. The drums 13 and 14 are rotated in opposite directions by power means, 15, 15a coupled to the drums. Also supported on the breadboard are timer means, i.e., a cam wheel and dead spot 73, 73 which are connected to the power means so as to rotate the drums at a predetermined fixed speed and in a predetermined sequence. Supported on the breadboard are payoff reels 1, 2, 3 and take-up reels 36, 49 for the tapes which are moved at the aforesaid speed and sequence. The payoff reels are disposed to one side of the drums while the take-up reels are disposed to the other side of the drums. Thus, these reels are respectively designed to unwind and wind the elongated tapes. On the one side of the drums with the payoff reels are collection means, i.e., a recessed roller 30 and guide means to guide the tapes to a junction and then guide the joined tapes along a predetermined travel path, in figure-eight fashion around the drums through said contact surface. On the other side of the drums are separation means such as two rollers 34, 35 to guide one of the tapes in one direction and the other tapes in another direction to a take-up roller. Along the travel path of tape 1a near the payoff reel of tape 1a is a sample dispensing station including means to dispense a sample drop. Along the path of travel of tape 3a is a drying zone or chamber 43 and a reading station 47. At the reading station 47 are means for the transmission of monochromatic light disposed on one side of the path of travel of tape 3a so as to transmit light through said tape, and, light absorbance measuring means on the other side of said tape travel path, disposed to receive said light passing through the tape. The light absorbance measuring means is coupled to a printout device which will print out the concentration of the component on the tape which is being assayed. As an alternative, when fluorescence studies are made, an ultraviolet light source irradiates the tape from below collimated to form a beam at 45° to the spot. A filter on the same side for the visible light permits the reading at 90°. The timer means 73, 74 may be activated by a switch arrangement 11 which is enabled by the passage of a confined spot wafer past the switch. This enables the switch and starts a timer motor turning cam wheel 73. The dead spot 74 on the cam wheel moves which in turn stops the main motor until the cam wheel has turned a full revolution and the main motor switch again enters main motor switch 74. This arrangement intermittently stops the confined spots and corresponding areas at designated work stations. Furthermore, at the reading station means are provided for locating the light sensitive areas produced by the reaction of the sample to be assayed and the reagent so that the printout devices activated when the maximum reading point is reached. The sample may be dispensed from an autodilutor or by the tilting and blowing out of a capillary tube. The reagent on the reagent-containing tape 3a may be a dry reagent or may be applied by a wick roller turning in a reagent container which has means to keep the reagent level constant.

To keep the tapes under tension at all times, the payoff reels should have spring clutches and the take-up reels should be under constant spring tension. The confined spots used herein preferably are porous material on a plastic tape.

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention and appended claims.

I claim:

1. A device for automated chemical analysis comprising in combination:

a support structure for supporting the various components of the apparatus;

first and second drums supported thereon disposed for rotation along a contact surface in contact with one another, at least one of said drums being spring loaded and biased towards the other drum;

power means coupled to said drums for rotating said drums in opposite directions; both drums being positively driven;

timer means supported on said support structure connecced to said power means rotating said drums for a predetermined time at predetermined intervals;

at least two payoff reels and two take-up reels supported thereon, moved by said power means for said time and said intervals, said payoff reels being disposed to one side of said drums while said take-up reels being disposed to the other side of said drums, said reels being respectively designed to unwind therefrom and wind thereon an elongated tape;

collection means supported on said one side for joining the tapes from said payoff reels together including guide means to guide said joined tapes in a predetermined path of travel around said drums and through said contact surface;

separation means supported on said other side for separating said joined tapes including guide means to direct respective tapes along at least two travel paths to predetermined take-up reels; and a reading station along one of said travel paths including structural means to accommodate reading means at said reading station, disposed to read the contents of one of said tapes.

2. A device as claimed in claim 1 including a reagent station on the one side of said structure including container means to hold a reagent and disposed adjacent the path of travel of one of said tapes before reagent dispensing means being joined with said other tape including to apply a reagent to said tape.

3. A device as claimed in claim 1 including a heating shoe disposed at least partially around at least one of said drums to heat said joined tapes traveling around said drums.

4. A device as claimed in claim 1, including a drying zone defined on the other side of said structure intermediate said separation means and said reading station disposed so that the tape passing to said reading station shall first pass through said drying zone.

5. A device as claimed in claim 1 including a sample receiving including sample depositing means for depositing a sample on one of said tapes.

6. A device as claimed in claim 1 including monochromatic light transmission means at said reading station disposed on one side of said tape for transmitting said light through said tape, light absorbance measuring means, on the other side of said tape disposed to receive said light passing through said tape and a printout device responsive to said absorbance measuring means printing out the concentration of the component on said tape being assayed.

7. A device as claimed in claim 2 including a monochromatic light transmission means at said reading station disposed on one side of said tape for transmitting said light through said tape;

light absorbance measuring means disposed on the the other side of said tape to receive light passing through said tape a printout device responsive to said absorbance measuring means printing out the concentration of a component on said tape and, reagent tape guide means forming part of said separation means to guide said reagent-containing tape past said reading station.

8. A device as claimed in claim 2 including ultraviolet irradiating means including a detector for monitoring the fluorescence caused by reaction products produced on the reagent tape when irradiated by the ultraviolet light.

9. A device as claimed in claim 1 wherein at least one of said payoff reels is designed to contain a tape with confined spot areas thereon said timer means including a switch arrangement along the path of travel of said tape including switch means being activated by said confined spot reading the area where said switch arrangement is located permitting intermittent moving means coupled to said power means to intermittently stop said confined spots at a first station where a sample can be placed on one tape and at said reading station where the sample can be read off another tape.

10. A device as claimed in claim 6 including means for locating the light sensitive areas produced by the reaction of the sample to be assayed and the reagent so that the print-out device is activated when the maximum reading point is reached.

11. A device as claimed in claim 2 said reagent dispensing means consisting of a spray arrangement.

12. A device as claimed in claim 2 said reagent dispensing means including a roller dipping into said container, motor means to rotate said roller constantly moistening the passing tape with reagent and means to keep the level of reagent constant in said container.

13. A device as claimed in claim 1 in which said payoff reels have friction clutches and said take-up reels are under constant spring tension so that the tapes are under tension at all times.

14. A device as claimed in claim 1, including a plastic tape around one of said pay-off reels having thereon discs of absorbent material disposed thereon at equal intervals so as to receive and maintain the samples to be analyzed in a confined area.

15. A device as claimed in claim 1, including sensing means for locating the position of the sample on one of the tapes and controlling the location of said sample so as to program the movement of the tapes.

References Cited

UNITED STATES PATENTS

| | | | |
|---|---|---|---|
| 3,036,893 | 5/1962 | Natelson | 23—253 XR |
| 3,036,894 | 5/1962 | Forestiere. | |
| 3,260,413 | 7/1966 | Natelson | 23—253 XR |

MORRIS O. WOLK, Primary Examiner

R. E. SERWIN, Assistant Examiner